United States Patent [19]

Shin

[11] 4,036,151

[45] July 19, 1977

[54] MICROWAVE COOKING APPARATUS WITH TURNTABLE

[75] Inventor: Yasuo Shin, Ikoma, Japan

[73] Assignee: Sharp Kabushiki Kaisha, Osaka, Japan

[21] Appl. No.: 590,512

[22] Filed: June 26, 1975

Related U.S. Application Data

[63] Continuation of Ser. No. 362,217, May 21, 1973, abandoned.

[30] Foreign Application Priority Data

May 26, 1972 Japan .............................. 47-63713[U]

[51] Int. Cl.² ............................................. A47B 85/00
[52] U.S. Cl. ..................................................... 108/20
[58] Field of Search ........................ 99/DIG. 14, 423; 108/20, 139, 141; 312/125, 135, 252, 236

[56] References Cited

U.S. PATENT DOCUMENTS

| | | | |
|---|---|---|---|
| 905,018 | 11/1908 | Sullivan et al. .......................... 108/20 |
| 1,444,042 | 2/1923 | Schwalbach ............................ 108/20 |
| 1,448,446 | 3/1923 | Hulbert ................................ 108/20 X |
| 1,575,988 | 3/1926 | Gleerup-Möller .............. 312/252 X |
| 1,608,704 | 11/1926 | McConaha ............................ 108/20 |
| 2,650,554 | 9/1953 | Faulds ............................... 211/144 X |
| 2,724,764 | 11/1955 | Ritchie ................................ 99/423 X |
| 3,012,496 | 12/1961 | Kelley et al. ........................... 99/423 |
| 3,046,052 | 7/1962 | Summers ......................... 108/139 X |
| 3,302,594 | 2/1967 | Burnett et al. ....................... 108/139 |
| 3,302,632 | 2/1967 | Fichtner ......................... 99/DIG. 14 |
| 3,410,116 | 11/1968 | Levinson ......................... 99/DIG. 14 |
| 3,448,701 | 6/1969 | Cordova ................................ 108/20 |
| 3,740,513 | 6/1973 | Peters, Jr. ......................... 312/236 X |
| 3,836,003 | 9/1974 | Vilen ..................................... 108/20 |

*Primary Examiner*—James T. McCall
*Attorney, Agent, or Firm*—Birch, Stewart, Kolasch and Birch

[57] ABSTRACT

In a type of the microwave cooking apparatus provided with a turntable rotating foodstuffs within the oven cavity to effect uniform heating, the turntable is provided to freely couple with or separate from a power transmission system including a power source. In particular, the turntable is utilized as a foodstuff shelf within the oven cavity when the it is associated with the power transmission system and also is utilized as a cooking tray when it is removed from the power transmission system and desposed directly on a dining table.

4 Claims, 7 Drawing Figures

MICROWAVE COOKING APPARATUS WITH TURNTABLE

BACKGROUND OF THE INVENTION

This application is a continuation, of copending application Ser. No. 362,217, filed on May 21, 1973, now abandoned.

This invention relates to a microwave cooking apparatus, and more particularly to an improved turntable mechanism for use in a microwave cooking apparatus. The turntable can be utilized both as a foodstuff shelf within the oven cavity and as a cooking tray on the dinning table.

In the past microwave cooking apparatus have been provided with a turntable on which the foodstuffs are placed to effect uniform heating. The turntable is tightly secured to one end of a rotary shaft passing through an oven wall and thus utilized in the oven cavity only as a foodstuff shelf on which the foodstuff is mounted. That is to say, since the turntable is not removably affixed to the rotary shaft by fastening materials, it is not capable of being utilized as a tableware or dish. Therefore, in the microwave heating foodstuffs, the food is first put in a receptacle or packed with a nylon wrap and then placed on the turntable for the microwave cooking. After microwave irradiated foodstuff accommodated in the receptacle or the wrap on the turntable is taken out of the oven, it is dished up on another tray.

As discussed above, the turntable can not serve as an item of tableware and in the case of microwave heating, a receptacle for accommodating the foodstuff therein is required or the foodstuff must be packed within a nylon wrap. The microwave cooking is time consuming. Furthermore, in the case where the foodstuff is directly mounted on the turntable without any container, the turntable becomes dirty due to stock or gravy from the foodstuff and accordingly should be cleaned from time to time by unfastening the connecting metallic pieses.

In addition, the turntable is limited to low dielectric loss materials because it is subjected to the microwave energy in the oven compartment and also to high workability materials such as a rubber or a synthetic resin, in view of connecting the connection mechanism thereof with the rotary shaft. However, it is not possible to ignore the dielectric loss properties of the rubber or the synthetic resin and therefore there is the possibility that the turntable will absorb the microwave causing it to be hearted and accordingly weakened. As a consequence the turntable may be deformed entirely or locally and eventually carbonized and ignited.

OBJECTS AND SUMMARY OF THE INVENTION

Accordingly, the first and main object of this invention is to provide a turntable mechanism wherein connection between a turntable and a revolution force transmission system is designed in a removable construction whereby the turntable serves as both a foodstuff mounting shelf and as a tableware which saves the labor of transferring the foodstuff to another container while maintaining the completion conditions of the cooked foodstuff.

The second object of this invention is to provide a turntable mechanism containing the above removable connection means between the turntable and the power transmission system to facilitate the removal of contaminations adhered to the surface of the turntable.

The third object of this invention is to provide a turntable driving mechanism exercising stable power transmission by utilizing the periphery position of the turntable close to the edge thereof. According to the conventional construction wherein the rotary shaft is disposed at the center, the rotary shaft is loaded with the tare of the turntable and the weight of the foodstuff and accordingly this load produces a great strain on the shaft and the journal, etc. causing troubles in the turntable driving mechanism.

The fourth object of the present invention is to provide a power transmission mechanism for use in a microwave oven exercising power transmission by utilizing the periphery position of the turntable to simplify or omit a reduction gearing system.

The fifth object of this invention is to provide an apparatus for coupling the turntable with the revolution transmission mechanism including a strut supporting the turntable at the bottom wall of the oven cavity wherein the height is adjustable with respect to the oven bottom wall to compensate for differences in the shape and size of the turntable which occur during the turntable forming process.

The sixth object of this invention is to provide a turntable having a shape appropriate to dispose of liquid ingredients discharged from the foodstuff in operation of the oven.

The seventh object of this invention is to provide a solid turntable which is made of an inorganic material having low dielectric properties such as glass, ceramic materials, etc. which does not weaken and deform, even when the microwave is irradiated a large amount.

Additional object of this invention will appear from the following description of specific examples of the embodiments thereof, when taken in conjunction with the attached drawings.

DESCRIPTION OF THE PREFERRED EMBODIMENTS

Figure 1:
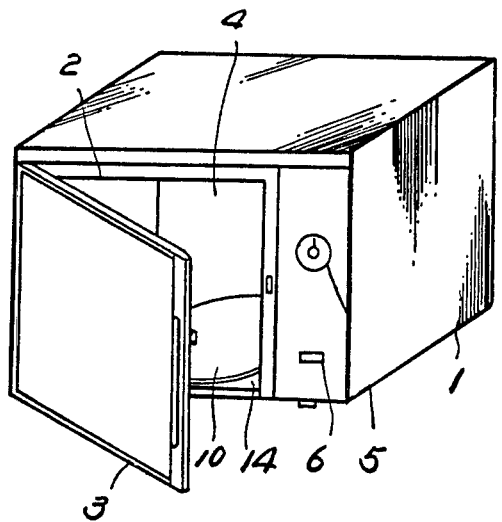
FIG. 1 is a perspective view of the external appearance of the microwave cooking apparatus.

Referring now to FIG. 1, the reference numeral 1 designates a metal cabinet having an opening 2 on its front wall for insertion and withdrawl of the foodstuff. A door 3 is affixed to the front wall by means of a hinge to freely open and close the opening 2. The oven cavity 4 is a rectangular box made of stainless steel or aluminium and is enclosed within the cabinet 1. The foodstuff is placed in the oven cavity 4. A magnetron (not shown) is coupled directly or via a waveguide with the oven 4 and activated to heat the foodstuff when the door 4 closes the opening 3 and a power switch is turned on. A timer 5 is installed on the front panel of the cabinet 1 and thus the magnetron is operative only during the period of time set by the timer 5. A cook switch 6 supplies cooking start instructions after setting the timer 5.

A circular turntable 10 on which the foodstuff is mounted is positioned on the bottom wal 14 of the oven 4 cavity while a circular concave having a radius equal to or larger than the radius of the turntable 10 and of sufficient depth is formed on the bottom wall 14. The turntable 10 is made up of low dielectric loss materals such as a ceramic or porcelain material. Furthermore, it is preferable if the turntable is made of an inorganic material which is not weakened at the cooking temperatures.

Figure 2:
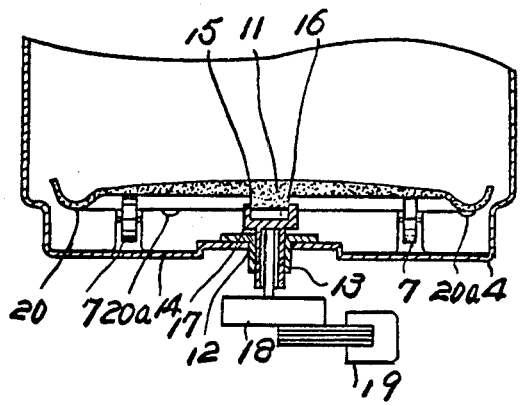
FIGS. 2 through 5 are sectional views of various embodiments of the turntable mechanism used in the microwave cooking apparatus.

FIG. 2 illustrates a first embodiment of the turntable 10 positioned on the bottom wall of the oven. A journal 13 is disposed in an aperture 12 formed in the center of the oven bottom 14 and a coupling shaft 17 driven by a speed reduction system 18 including motor 19 is inserted in the journal 13. A square depression 16 is established in the head of the coupling shaft 17 to positively transmit the revolution force to the turntable 11. Thus, the turntable 11 is provided on the bottom portion thereof with a square swelling 15 adapted to fit in the square depression 16. Thus, the turntable 11 is removably installed on the coupling shaft 17 utilizing a combination of the depression 16 and the swelling 15. Freely rotating rollers 7 are affixed to the bottom wall 14 to movably support the turntable 11 at plural points.

The turntable 11 supports and carries the foodstuff thereon as a foodstuff shelf to effect uniform heating and, after completion of the cooking process, is separated from the coupling shaft 17 so as to be utilized as a tableware, such as a dish or tray. For this reason the turntable 10 is further provided at its peripheral position with an annular projection 20 which extends to the same plane as the swelling 16 thereby preventing the turntable 10 from becoming unstable when it is removed from the oven 4 and placed on the dinning table. By providing the annular projection 20 on the bottom of the turntable 10, an annular groove is provided on the top of the turntable 10, serving as a drain for collecting the liquid ingredients from the foodstuff.

Figure 6:
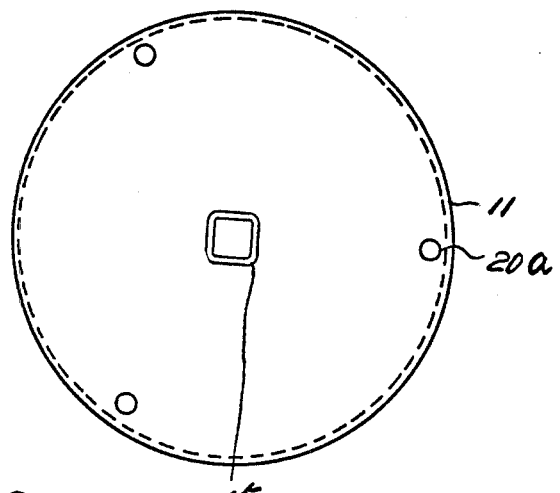
FIGS. 6 and 7 are bottom views of the turntable of the present invention.

The turntable 11 includes legs 20 a formed at a plurality of positions, for example, three positions equally dividing the whole length of the annular projection 20 into three substantially equal sections for stabilizing the turntable. See FIG. 6 in this regard. In addition, in order that the stock or gravy from the foodstuff drops into the annular groove effectively, the central surface of the turntable 10 is made higher than the peripheral surface thereof, Thus the peripheral surface is provided with a gradual inclination. In this way the turntable 10 may be utilized as a convenient cooking tray.

A modification of the rotating drive system useful for the above mentioned turntable utilized both as shelf and a dish will now be described.

Figure 3:
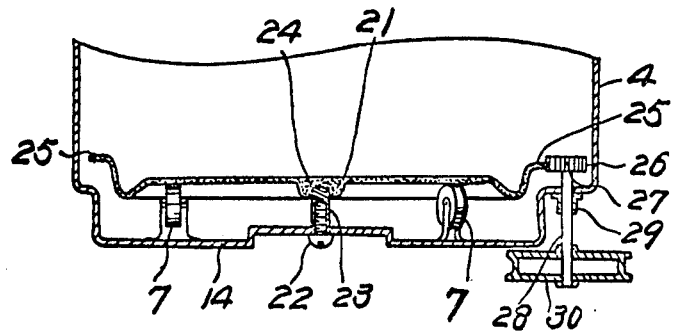

FIG. 3 illustrates a second embodiment of the driving mechanism which transmits the revolution force to the turntable according to the present invention wherein the turntable is removably coupled with the revolution force transmission system by utilizing the peripheral edge of the circular turntable. In this drawing a plurality of the rollers 7 which are disposed on the bottom wall 14 can rotate freely in the same way as the first embodiment and also functions to support the turntable 21. A strut 23 secured at the center by a screw 22 supports or carries the central portion of the turntable 21. The strut 23 merely carries the turntable an does not receive the revolution force. The turntable 21 is provided on the bottom portion thereof with a projection 24 in which the central strut 23 fits.

Figure 7:
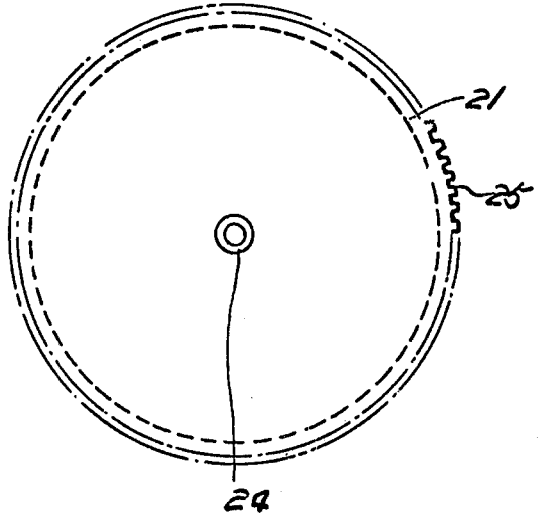

A flat extension portion is provided around the annular groove formed in the turntable 21, with teeth 25 which have a predetermined pitch as shown in FIG. 7. A transmission gear 27 having teeth spaced apart with the same pitch as that of the turntable teeth 25 and in engaging relationship therewith is deposited within the oven cavity. A rotary shaft 28 associated with the transmission gear 27 passes through a journal 29 tightly secured on the bottom wall 14 and protrudes from the oven wall to serve as a driving shaft for a pulley 30. The revolution power from a motor is fed to the pulley 30 via a belt thereby rotating the turntable at a predetermined rate. The turntable and transmission gear may be mechanically coupled by friction coupling.

It will be understood that the power transmission system is provided on the peripheral position and not on the central position in the second embodiment. In other words, the weight supporting mechanism and the power transmission mechanism are separated from each other and therefore the loads applied to the respective mechanism are remarkably reduced to minimize machine troubles. Furthermore, since the turntable is provided at its peripheral edge with teeth to serve as a gearing of comparatively large radius, the reduction ratio of the power transmission is larger. As a result a multi-stage reduction gearing is not necessary. Although the illustrated embodiment utilizes a pulley and belt, the rotary shaft of the transmission gear 27 may be directly coupled with the shaft of the motor. The flat brim portion of the turntable 21 having teeth 25 formed therein may be utilized as a grip to facilitate installation and removal of the turntable.

Figure 4:
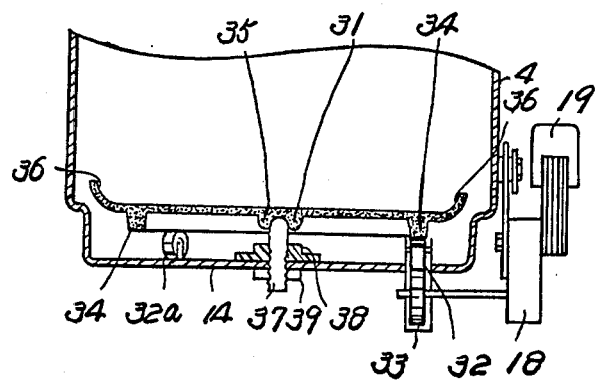

The third embodiment of this invention will be described with reference to FIG. 4.

A strut 37 supporting the turntable 31 at the central position thereof is tightly installed on the over bottom 14 by a bolt 38, etc. In the same way as the first and second embodiments three rollers 32, 32a is secured to the bottom wall 14 to effect stable movement of the turntable. The two rollers 32a are of the free rotating type and the remaining roller 32 is coupled with a power source to rotate the turntable 31. A transmission roller 33 is positioned to contact the remaining roller 32 and its rotary shaft is joined directly or via a speed reduction 18 with a motor 19 disposed on the exterior of the oven 4.

When the motor 19 starts rotating, the revolution force is fed to the roller 32 contacting the transmission roller 33 and accordingly the turntable 31 is rotated at a fixed rate via the roller 32 as the strut 37 supports the central position thereof.

The turntable 31 is especially shaped and adapted to the above driving mechanism and to be mounted on the rollers 32, 32a and the strut 23. The turntable 31 is provided at the periphery and at the bottom portion thereof with an annular projection 34 having the same radius as that of the three rollers 32, 32a and further is provided at its central bottom position with a concave portion 35 adapted to receive the strut 37. When the turntable 31 is installed, the strut 37 fits in the concave portion 35 and the annular projection 34 contacts the three rollers 32, 32a.

The turntable 31 is removable from the strut 37 and the rollers 32, 32a and, when it is utilized as a cooking tableware, its annular projection 34 serves as a leg. The concave region 35 does not protrude from a plane containing the leg 34.

To ensure transmission between the roller 32 and the turntable 31 the surface of the annular projection 34 contacting the roller 32 is provided with a rough finish while the roller 32 is made of a material having a coefficient of friction or said roller is with a material having a large coefficient of friction. Furthermore, the turntable 31 is provided with a raised edge 36 to contain the foodstuff when used as the tableware. The strut 37 is supported by a screw mechanism containing an upper bolt 38 and a lower bolt 39 and thus its height with respect to the bottom is adjustable.

As described above, the third embodiment drives directly the bottom of the turntable so that the transmission mechanism is simplified and the gearing system can be disposed between the turntable and the oven bottom to effectively utilize the space of the oven cavity. Moreover, steady rotation of the turntable can be effected even if the surface of the turntable is more or less finished rough because the strut 37 supporting the turntable 31 is height-adjustable.

Figure 5:
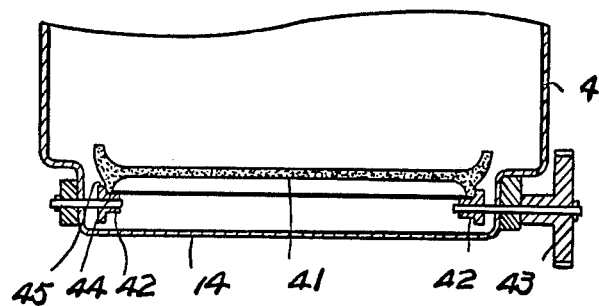

FIG. 5 illustrates the fourth embodiment wherein the turntable and the roller are specially shaped and formed in order to omit the strut 37 used in the above embodiment.

Four rollers 42, 42a are deposited at four corner of the oven 4 of which three rollers 42a are of free rotating type and only the remaining roller 42 is utilized as a power transmission gear. A transmission gear 43 coupled with a rotary shaft of a roller 42 within the oven is disposed on the exterior of the oven to transmit the revolution of the motor to the turntable 41. The four rollers 42, 42a are shaped to include a conical section and column section while the bottom of the turntable 41 is shaped to a flat section 44 and an inclination section 45 fitting and sliding along the conical and column sections respectively.

I claim:

1. A turntable for use in a microwave oven, made of a low dielectric loss inorganic material such as glass and ceramics and adapted to rotate a foodstuff mounted thereon at the base portion of said microwave oven during cooking, said turntable being removably engaged with the base of the microwave oven and comprising:

a raised edge provided at the peripheral portion of the upper surface thereof and serving as a drain for collecting the liquid ingredients from the foodstuff; a connection provided on the turntable and removably engaged with a source of driving force for rotating said turntable, said engagement providing a pedestal for rotation of said turntable; and one or more legs provided at the lower surface thereof for stabilizing the turntable when positioned on a level surface, whereby said turntable, because of its removable engagement with the driving source, functioning as a foodstuff supporter within the oven and as a tableware when the turntable is removed from the oven.

2. A turntable as defined in claim 1, wherein said raised edge defines an annular groove disposed at the peripheral portion of the upper surface thereof.

3. A turntable as defined in claim 1, wherein said connection comprises a swelling extending from the lower surface of said turntable to removably engage with a depression operatively associated with the driving source.

4. A turntable as defined in claim 1, wherein said connection comprises teeth formed at the peripheral sidewall of the turntable and adapted to mesh with a transmission gear operatively associated with the driving source.

* * * * *

UNITED STATES PATENT AND TRADEMARK OFFICE
CERTIFICATE OF CORRECTION

PATENT NO. : 4,036,151
DATED : July 19, 1977
INVENTOR(S) : Yasuo SHIN

It is certified that error appears in the above-identified patent and that said Letters Patent are hereby corrected as shown below:

IN THE HEADING OF THE PATENT

Under "[30] Foreign Application Priority Data" insert the following:

-- May 19, 1972    Japan.........................47-60702[U]

May 26, 1972    Japan.........................47-63714[U] --

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*